United States Patent [19]

Esmond

[11] 4,411,784
[45] Oct. 25, 1983

[54] STACKED PLATE TRANSFER DEVICE

[76] Inventor: William G. Esmond, 8000 Country Club Rd., Havre de Grace, Md. 21078

[21] Appl. No.: 65,727

[22] Filed: Aug. 10, 1979

Related U.S. Application Data

[63] Continuation of Ser. No. 596,460, Jul. 16, 1975, abandoned.

[51] Int. Cl.³ ............................................... B01D 13/00
[52] U.S. Cl. ................................ 210/321.1; 210/433.2
[58] Field of Search ..................... 210/321, 23, 433 M, 210/634

[56] References Cited

U.S. PATENT DOCUMENTS 3,534,860 10/1970 Dibelius et al. ..................... 210/321
3,540,595 11/1970 Edwards .............................. 210/321
3,695,445 10/1972 Esmond .............................. 210/321

Primary Examiner—Ferris H. Lander
Attorney, Agent, or Firm—Charles E. Brown

[57] ABSTRACT

This disclosure relates to a transfer device, such as an artificial kidney, which is formed of a plurality of identical plates and wherein between each pair of adjacent plates first and second fluids flow on opposite sides of a transfer membrane. One face of each plate is provided with grooves defining flow passages and the other face of each plate is planar with there being a membrane clamped between unlike faces of adjacent plates and wherein the membrane is deformed into the grooves by fluid flowing along the planar surface of a plate at a pressure higher than the fluid flowing on the opposite side of the membrane in the grooves. The grooved side of the plate is provided with first distribution and collection channels and the planar side side of the plate is provided with second distribution and collection channels, the second channels being more widely spaced than the first channels and thereby providing for an elimination of the possibility of trapping of the fluid flowing on the planar face of each plate beyond its respective distribution and collection channels.

18 Claims, 5 Drawing Figures

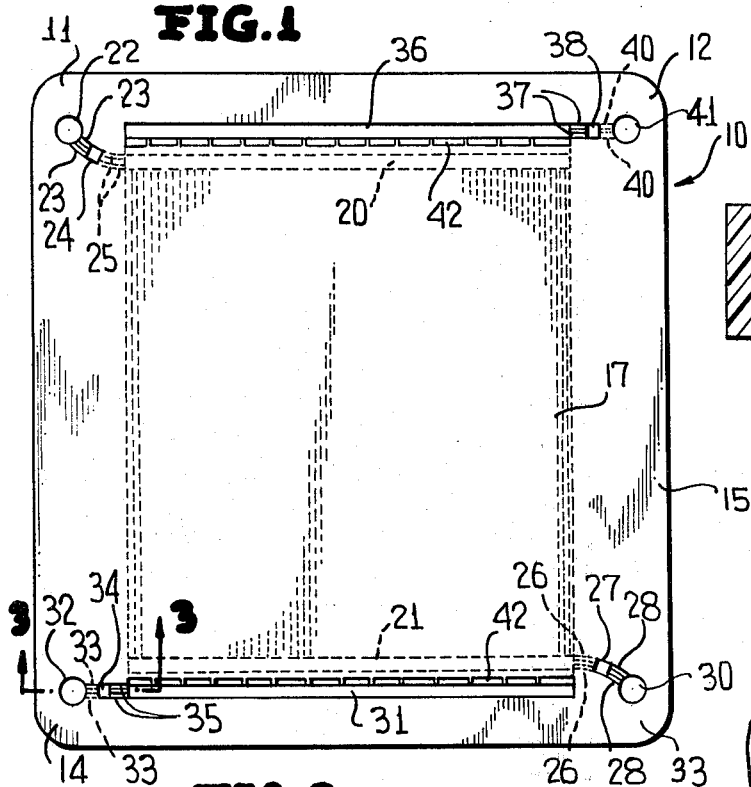
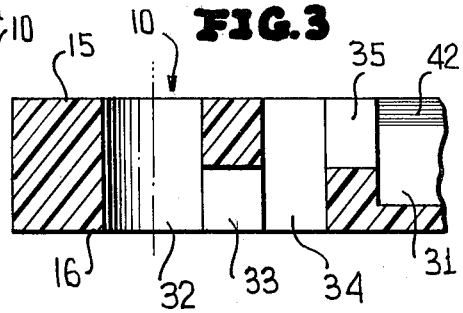
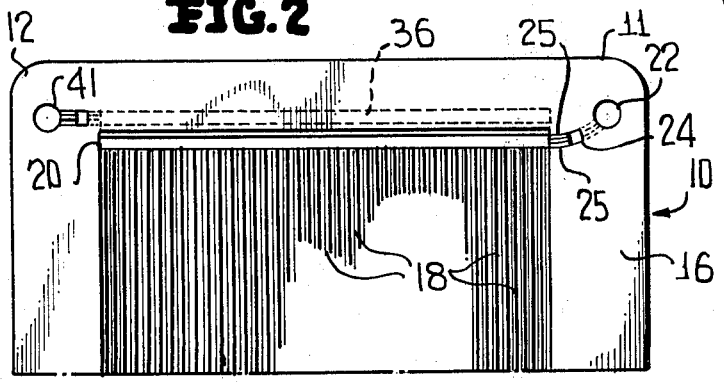
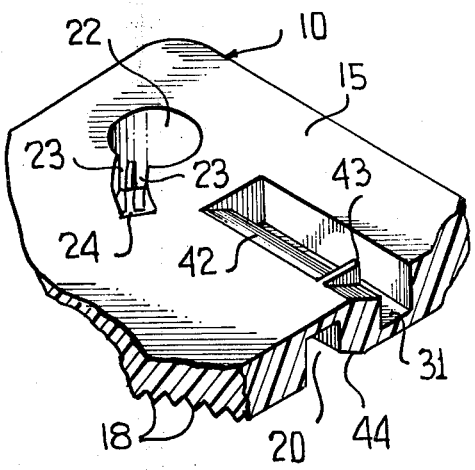
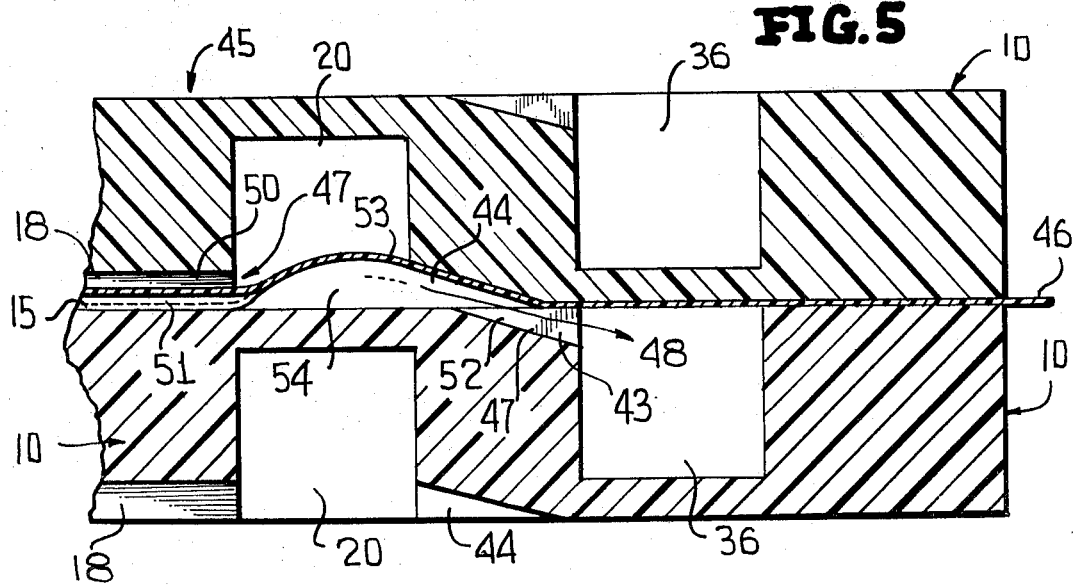

STACKED PLATE TRANSFER DEVICE

This is a continuation of application Ser. No. 596,460 filed July 16, 1975 and now abandoned.

This invention relates in general to new and useful improvements in transfer devices, and more specifically to a transfer device of the type which may be utilized as an artificial kidney.

In recent years there has been a great development in artificial kidneys with many of the artificial kidneys being in the form of a stacked unit including plates arranged is stacked relation and having a suitable membrane extending therebetween with the plates and the membranes defining flow passages on opposite sides of each membrane for blood and a dialysate. These artificial kidneys vary from one another primarily in the constructional details of the plates and the flow passages defined thereby. A primary deficiency of prior stacked plate exchange devices fall generally in the following categories:

1. Too expensive.
2. Not readily reuseable.
3. Variations in internal pressures of the fluids.
4. An undesired closing of passages by displacement of membranes.
5. The plates are readily assembled incorrectly.
6. There is a trapping and loss of blood.
7. The plates are unduly thick and therefore, not only costly, but requires a much larger package for the same transfer efficiency.

In accordance with this invention there is provided a stacked plate type transfer device utilizing only a single type of plate.

The single type of plate provided in accordance with this invention, once they are stacked with a preselected face up, cannot be turned to a place of misalignment.

Each plate is complete in of itself and has formed therein all the necessary ports, channels and flow passages required in the transfer assembly.

Each of the distribution and collection channels is formed fully within the plate and no shifting or distortion of the plates can occur so as to influence the balance fluid proportioning provided thereby.

The construction of the plates is such that the plates may be very thin and a maximum transfer can be obtained with a minimum size assembly.

The blood distribution and collection channels are disposed outwardly of the dialysate channels so as to prevent any possible trapping of the blood.

With the above and other objects in view that will hereinafter appear, the nature of the invention will be more clearly understood by reference to the following detailed description, the appended claims and the several views illustrated in the accompanying drawings.

FIG. 1 is a plan view of a plate formed in accordance with this invention.

FIG. 2 is a fragmentary bottom plan view of the plate of FIG. 1.

FIG. 3 is an enlarged fragmentary vertical sectional view taken along the line 3—3 of FIG. 1 and shows the details of a port and channel of the distribution system of the plate at one corner thereof.

FIG. 4 is an enlarged fragmentary perspective view of the upper left hand corner portion of the plate of FIG. 1 and shows more specifically the constructional details thereof.

FIG. 5 is an enlarged longitudinal sectional view through two plates only of a transfer assembly with the plates being separated by a membrane and the membrane being distorted as would occur with fluids flowing through the plates.

Referring now to the drawings in detail, it will be seen that there is illustrated in FIGS. 1 through 4 a plate formed in accordance with this invention, the plate being generally identified by the numeral 10. The plate 10 is of a generally rectangular outline and includes four corners 11, 12, 13, and 14, as is shown in FIG. 1. The plate 10 is preferably molded of a plastics material which is compatible with human blood.

The plate 10 includes a face 15 (FIG. 1) and a face 16 (FIG. 2). The face 15 is principally planar and includes a planar central portion 17. On the other hand, the face 16 has the central portion thereof provided with longitudinally extending grooves 18. At the opposite ends of the grooves 18 in direct communication with there is formed in the face 16 of the plate 10 a pair of transversely extending channels 20 and 21. For descriptive purposes, the channel 20 will be considered a distribution channel and the channel 21 to be a collection channel. However, as will be apparent hereinafter, if the plate 10 is rotated 180 degrees, the channels 20 and 21 may serve the opposite functions.

In the corner 11, the plate 10 is provided with an inlet port 22 which extends entirely through the plate 10 and has associated therewith passages 23 formed in the face 15, the passages 23 terminating in a through passage 24. Extending from the through passage 24 and formed in the face 16 of the plate 10 are further passages 25 which lead into the end of the channel 20 for supplying a first fluid thereto.

The first fluid is evenly distributed by the channel 20 into the grooves 18. At their opposite ends, the grooves 18 open into the collection channel 21. At the end of the collection channel 21 remote from that end of the distribution channel 20 into which a first fluid is supplied, the collection channel 21 opens into passages 26 formed in the face 16 of the plate 10. The passages 26 terminate at a through passage 27 and from the through passage 27, passages 28 formed in the face 15 of the plate 10 extend into a discharge port 30 which extends through the plate 10 at the corner 13 thereof.

Extending in parallel relation to, and disposed immediately adjacent the collection channel 21 is a distribution channel 31 for a second fluid. The channel 31, as is clearly shown in FIG. 4, is formed in the face 15 and opens therefrom.

The second distribution channel 31 is supplied with a second fluid by means of an inlet port 32 which extends through the plate 10 at the corner 14 thereof. Formed in the face 16 and extending inwardly from the port 32 is a pair of passages 33 which terminates in a through passage 34. Formed in the face 15 and extending from the through passage 34 into the channel 31 is a pair of passages 35.

The second fluid flows across the planar central portion 17 of the face 15 and is collected in a second collection channel 36. Collected second fluid flows from the collection channel 36 through a pair of passages 37 formed in the face 15 and which open into a through passage 38. From the through passage 38, discharge flow is through a pair of parallel passages 40 formed in the face 16 and opening into a discharge port 41 formed in the corner 12.

It will be readily apparent that if the plate 10 is rotated 180 degrees from the position shown in FIG. 1 so that the corners 11 and 13 and the corners 12 and 14 change places, there will be no difference in the appearance of the plate and thus no difference in the function thereof.

In order to facilitate the flow of a second fluid between the planar central portion 17 of the face 15 and the respective channels 31 and 36, each of the channels 31 and 36 is provided with a narrow tapering extension 42, as is best shown in FIG. 4. Each extension 42 tapers to a zero thickness at the face 15. Projecting into the extension 42 at intervals spaced longitudinally thereof are supports 43 for the purpose of supporting plate side 16 against collapse into the extensions 42 in a manner to be described hereinafter.

It is also to be understood that each of the channels 20 and 21 is provided with a shallow tapering extension 44 which is of the same configuration as the extensions 42. A typical extension 44 is best illustrated in FIG. 4. It is to be noted that the extensions 42 and 44 of adjacent second and first channels, respectively, overlap. In this manner the extensions 42 and 44 of adjacent second and first channels of adjacent plates may cooperate to define passage means which will be described hereinafter.

In accordance with this invention, a plurality of the plates 10 are to be stacked to form a transfer assembly 45, a portion only of which is illustrated in FIG. 5. All of the plates 10 will have like faces uppermost. Extending between each pair of adjacent plates 10 will be a membrane 46 which will have the desired transfer properties. It is to be understood that the membrane 46 between each pair of adjacent plates 10 may either be in the form of single preformed sheets or may be in the form of a single membrane which is reversely pleated between the plates 10.

It will be readily apparent from FIG. 1 that inasmuch as the membrane 46 extends between continuous planar peripheral face portions of the sheets 10, a complete seal will be formed between each adjacent pair of plates. Thus, flow with respect to the various ports, passages and channels will be restricted to the same, even though they open through the respective faces of each plate 10. This sealing effect is clearly shown in FIG. 5.

It is to be understood that the first fluid which is supplied by the distribution channel 20 and flows generally as indicated by the arrow 47 in FIG. 5 is at a lesser pressure than the second fluid and flows generally as indicated by the arrow 48 into the collection channel 36. The pressure of the second fluid against the underside of the membrane 46, as viewed in FIG. 5, forces that portion of the membrane which is disposed between the grooved central portion of the face 16 of the upper plate 10 and the planar central portion 17 of the face 15 of the lower plate 10 up into the grooves 18. Thus, the grooves 18, above the membrane 46, define first flow passages 50 while the distorted membrane 46 together with the face 15 of the lower plate 10 define second flow passages 51. The flow passages 50 and 51 are parallel to one another and are immediately adjacent to one another, separated only by the very thin membrane 46. It is also to be noted that flow within the flow passages 50 and 51 is in opposite directions, as indicated by the arrows 47 and 48.

Referring once again to FIG. 5, it will be seen that the channel extension 42, in conjunction with the channel extension 44, combines to define passage means 52 opening into the channel 36. The membrane 46 is deflected by the pressure of the fluid within the passage means 52 up against the upper surface of the upper plate 10 within the channel extension 44 while that portion of the membrane 46 aligned with the channel 20 is distorted upwardly into the channel as at 53 so as to define within the channel 20 and opposing the face 15 of the lower plate 10 channel means 54 in direct communication with the second flow passages 51.

It will be readily apparent that the spaced supports 43, prior to introduction of a second fluid into the assembly 45 supports the membrane 46 above each channel extension 42 so as to facilitate initial flow of a second fluid between the channels 31 and 36.

In the case wherein the transfer assembly 45 is in the form of an artificial kidney, it is to be understood that the dialysate is introduced into the channel 20, flows through the flow paths 50 and is collected in the channel 21 while the blood is introduced into the channel 31, flows through the flow paths 51, out through the channel means 54, through the passage means 52 and into the collection channel 36. At this time it is also pointed out that with respect to the distribution channel 31 and the collection channel 21, a like deformation of the membrane 46 occurs to define passage means and channel means similar to the passage means 52 and the collection means 54.

Although no supports corresponding to the supports 43 have been illustrated in conjunction with the channel extensions 44, it is to be understood that if it is found advisable to provide such supports, the same may be incorporated in the plates 10.

It is to be understood that a stack of the plates 10, together with the membrane or membranes 46 extending between each adjacent pair of plates will be clamped between two headers (not shown) which will be provided with suitable fittings for introducing and removing first and second fluids from the transfer assembly. The headers will have suitable connections for coupling to the ports 22, 30, 32 and 41.

It will be readily apparent from the foregoing that the plates 10 may be of relatively thin construction and may be readily molded from suitable plastics material. It will also be readily apparent that the plates 10, once they are all arranged to face in the same direction, can only be assembled in the correct manner, and when once assembled, there can be no relative movement of the plates with respect to one another or with respect to the membrane so as to modify fluid flow within the transfer assembly. Further, it will be readily apparent that there is no possible way that the second fluid, which is at the higher pressure of the two fluids, can be trapped in the plate stack. It may be envisioned that if the fluid within the channel 20 were at a higher pressure than within the channel 36, as viewed in FIG. 5, the fluid could depress the membrane 46 so as to escape to a position overlying the channel 36 and thus be trapped. However, by arranging the channels 31 and 36 for the higher pressure fluid outwardly of the channels 20 and 21 for the lower pressure fluid, there can be no trapping of either of the two fluids within the plate stack.

Although only a preferred embodiment of the invention has been specifically illustrated and described herein, it is to be understood that minor variations may be made in the plate configuration and the transfer assembly without departing from the spirit and scope of the invention, as defined by the appended claims.

I claim:

1. A transfer assembly comprising a plurality of generally flat plates arranged in stacked relation, and a membrane extending between each pair of adjacent ones of said plates in sealed relationship with peripheral portions of said plates, each of said plates having a grooved side and a planar side, a central portion of said grooved side having a plurality of adjacent grooves formed therein and defining first flow paths, a central portion of said planar side aligned with said grooved side central portion being planar, a first distribution channel and a first collection channel for a first fluid in said grooved side extending transversely of said grooves at opposite ends of said grooves and in direct communication with said first flow paths, a similar second distribution channel and second collection channel for a second fluid in said planar side in spaced relation to said planar central portion with said membrane being deformable into said grooved side of a next adjacent plate to place said second distribution channel and said second collection channel in communication with said planar central portion across those portions of said planar side between said second distribution channel and said second collection channel and said planar central portion for urging said membrane partially into said grooves to define second flow paths for the second fluid.

2. The transfer assembly of claim 1 wherein each of said channels for its full length opens through a respective face of said plates and is closed thereat by said membranes.

3. The transfer assembly of claim 1 wherein said second channels are displaced relative to adjacent ones of said first channels away from said grooves.

4. The transfer assembly of claim 3 wherein each of said channels for its full length opens through a respective face of said plates and is closed thereat by said membranes.

5. The transfer assembly of claim 4 wherein adjacent ones of said plates have formed therein passage means between adjacent ones of said first and second channels, each said passage means opening into an outer portion of the respective first channel and being separated from an inner portion of said respective first channel by a respective one of said membranes, and said first channel outer portion forming channel means for direct communication of said second channels with said second flow paths.

6. The transfer assembly of claim 5 together with support means in said passage means and spaced along the length of said passage means for supporting said respective membrane against closing of said passage means.

7. The transfer assembly of claim 5 wherein said passage means is in part formed in each of said adjacent plates.

8. The transfer assembly of claim 5 wherein said passage means is in part formed in each of said adjacent plates and includes an extension of said respective first channel in one of said adjacent plates extending towards said respective second channel, and an extension of said respective second channel in the other of said respective plates extending towards said respective first channel.

9. The transfer assembly of claim 8 wherein said extensions overlap.

10. The transfer assembly of claim 1 wherein said plates are each of a single thickness.

11. The transfer assembly of claim 1 wherein all of said plates are identical.

12. A flow plate for a transfer assembly, said flow plate being of a generally rectangular outline and having a grooved side and a planar side, a central portion of said grooved side having a plurality of adjacent grooves formed therein and defining first flow paths, a central portion of said planar side aligned with said grooved side central portion being planar, a first distribution channel and a first collection channel for a first fluid in said grooved side extending transversely of said grooves at opposite ends of said grooves and in direct communication with said first flow paths, a similar second distribution channel and second collection channel for a second fluid in said planar side, and said second channels each being displaced relative to an adjacent one of said first channels away from said grooves and thereby being widely spaced from planar central portion.

13. A flow plate in accordance with claim 12 wherein each of said channels for its full length opens through only one face of said plate.

14. A flow plate according to claim 12 wherein each second channel has an extension in the associated face of said plate extending towards an adjacent one of said first channels, each extension extending the full length of the respective second channel.

15. A flow plate according to claim 14 together with plural support means in said extension spaced longitudinally along said extension.

16. A flow plate according to claim 12 wherein each second channel has an extension in the associated face of said plate extending towards an adjacent one of said first channels, and each first channel has an extension in the associated face of said plate extending towards an adjacent one of said second channels, said extensions overlapping and extending the full lengths of said first and second channels.

17. The plate of claim 12 wherein said plate is rectangular and symmetrical about diagonals thereof whereby orientation of said plates is assured.

18. The plate of claim 12 wherein said plate has four corners, a fluid port through said plate in each corner, and diagonally opposite ones of said ports being inlet and discharge ports for one only of two different fluids.

* * * * *